United States Patent
Hsieh

(10) Patent No.: US 8,145,811 B2
(45) Date of Patent: Mar. 27, 2012

(54) UNIVERSAL SERIAL BUS DRIVING DEVICE FOR PRESETTING MAXIMUM ACTIVE TRANSACTION NUMBER FOR DATA REQUEST TO BE SYNCHRONOUSLY PROCESSED BY A DATA TRANSMITTER

(75) Inventor: Cheng-Feng Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 870 days.

(21) Appl. No.: 12/206,731

(22) Filed: Sep. 8, 2008

(65) Prior Publication Data

US 2009/0193422 A1   Jul. 30, 2009

(30) Foreign Application Priority Data

Jan. 24, 2008   (CN) .......................... 2008 1 0300201

(51) Int. Cl.
*G06F 3/00* (2006.01)
*G06F 5/00* (2006.01)
(52) U.S. Cl. .......................................... 710/62; 710/60
(58) Field of Classification Search .................. None
See application file for complete search history.

(56) References Cited

U.S. PATENT DOCUMENTS 7,231,473 B2 * 6/2007 Yen ................................. 710/62
7,698,482 B2 * 4/2010 Venkata et al. .................. 710/60

FOREIGN PATENT DOCUMENTS

TW             I273426        2/2007

* cited by examiner

*Primary Examiner* — Tammara Peyton
(74) *Attorney, Agent, or Firm* — Altis Law Group, Inc.

(57) ABSTRACT

A universal serial bus (USB) driving device electrically coupled to a data receiver is configured for driving a USB to forward data requests from the data receiver to a data transmitter for processing the data requests. The USB driving device may preset a maximum active transaction number, initialize an active transaction number, and determine if the active transaction number is less than the maximum active transaction number. The USB driving device may drive the USB to forward a data request from the data receiver to the data transmitter if the active transaction number is less than the maximum active transaction number and increase the active transaction number after the USB driving device forwards a data request to the data transmitter. A USB driving method is also provided.

12 Claims, 3 Drawing Sheets

UNIVERSAL SERIAL BUS DRIVING DEVICE FOR PRESETTING MAXIMUM ACTIVE TRANSACTION NUMBER FOR DATA REQUEST TO BE SYNCHRONOUSLY PROCESSED BY A DATA TRANSMITTER

BACKGROUND

1. Field of the Invention

Embodiments of the present disclosure relate to driving data transmitting interfaces and, more particularly, to a universal serial bus driving device and method.

2. Description of Related Art

Universal serial bus (USB) is a common interface for transmitting data between network devices, such as routers and gateways. In one such data transmission, a data receiver sends a data request to a data transmitter via a USB interface after the data receiver requests data from the data transmitter. After receiving the request, the data transmitter prepares the requested data for the data receiver and transmits the requested data to the data receiver via the USB interface. The data receiver can send another data request only after having finished receiving the prepared data. Therefore, there is only one active transaction in the data transmitter at a time, which makes the data transmission inefficient.

Therefore, a heretofore unaddressed need exists in the home devices to overcome the aforementioned deficiencies and inadequacies.

SUMMARY

A universal serial bus (USB) driving device, electrically coupled to a data receiver and configured for driving a USB to forward data requests from the data receiver to a data transmitter for processing the data requests, the USB driving device including: a parameter managing module configured for presetting a maximum active transaction number, initializing an active transaction number, and determining if the active transaction number is less than the maximum active transaction number, wherein the maximum active transaction number is an allowable maximum number of data requests synchronously processed by the data transmitter, wherein the active transaction number indicates a number of the data requests forwarded to the data transmitter from the data receiver; and a request processing module configured for driving the USB to forward a data request from the data receiver to the data transmitter if the active transaction number is less than the maximum active transaction number; wherein the parameter managing module is further configured for increasing the active transaction number after the request processing module forwards a data request to the data transmitter.

Other advantages and novel features of the present disclosure will be drawn from the following detailed description, in which:

DETAILED DESCRIPTION OF CERTAIN INVENTIVE EMBODIMENTS

Figure 1:
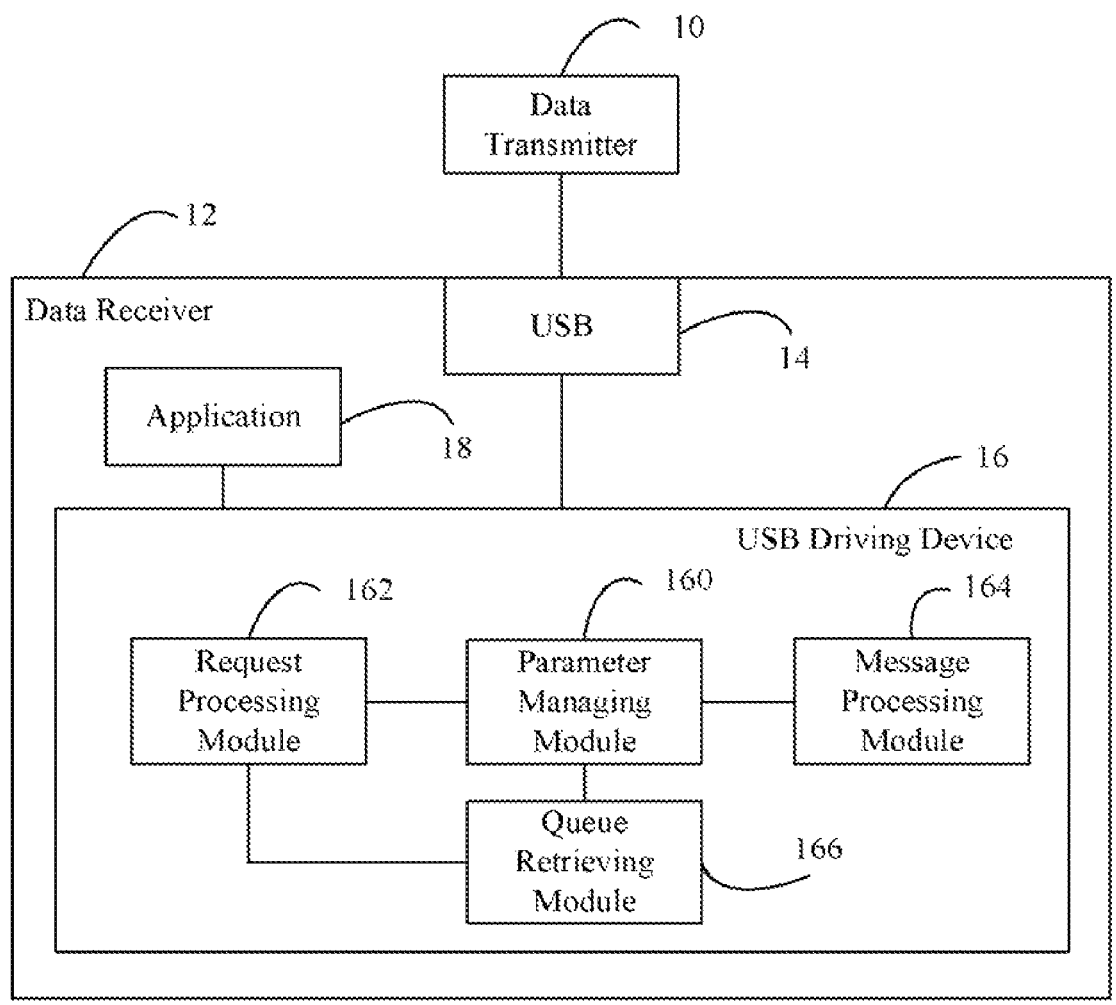
FIG. 1 is schematic diagram of one embodiment of an application environment and functional modules of a universal serial bus (USB) driving device in accordance with the present disclosure.

FIG. 1 is schematic diagram of one embodiment of an application environment and functional modules of a universal serial bus (USB) driving device 16 in accordance with the present disclosure. In one embodiment, the USB driving device 16 is electrically coupled to a data receiver 12 and is configured for driving a USB 14 to forward data requests from the data receiver 12 to a data transmitter 10 for processing the data requests. Via the USB driving device 16, an application 18 of the data receiver 12 drives the USB 14 to receive data from the data transmitter 10. In one embodiment, the data receiver 12 may be a network communication device that communicates with other communication devices via the USB 14, such as a router or a network gateway.

In one embodiment, the USB driving device 16 includes a parameter managing module 160, a request processing module 162, a queue retrieving module 166, and a message processing module 164. The modules 160, 162, 164, 166 may be used to execute one or more operations for the USB driving device as will be further explained herein below. One or more general or specialized processors may be used to execute one or more operations for the modules 160, 162, 164, 166.

The parameter managing module 160 is configured for presetting a maximum active transaction number, initializing an active transaction number, and determining if the active transaction number is less than the maximum active transaction number. In one embodiment, the maximum active transaction number is a constant that indicates an allowable maximum number of data requests synchronously processed by the data transmitter 10. The active transaction number indicates a number of the data requests forwarded to the data transmitter 10. The active transaction number is a variable that varies along with the number of data requests processed by the data transmitter 10. An initial value of the active number may be 0, for example. In one embodiment, the data transmitter 10 can continue to process more data requests if the active transaction number is less than the maximum active transaction number. If the data transmitter 10 is already synchronously processing the allowable maximum number of data requests, the data transmitter 10 cannot process further data requests until at least one of the active transactions have been completed.

The request processing module 162 is configured for receiving one or more data requests from the application 18 of the data receiver 12 and driving the USB 14 to forward the data requests to the data transmitter 10 if the parameter managing module 160 has determined that the active transaction number is less than the maximum active transaction number. In one embodiment, the data transmitter 10 transmits a completing message and requested data to the data receiver after receiving the data request. The completing message indicates that the data transmitter 10 has finished preparing the requested data for the application 18. The application 18 sends a data request to the request processing module 162 if the application 18 needs to receive data. If the active transaction number is less than the maximum active transaction number, the request processing module 162 drives the USB 14 to forward the data request to the data transmitter 10. If the data transmitter 10 has received the data request, the data transmitter 10 prepares the requested data for the application 18 of the data receiver 12 according to the data request and then sends a completing message to the USB diving device 16 via the USB 14. The USB diving device 16 transmits the prepared data to the application 18 via the USB 14 after the completing message is received.

The queue retrieving module 166 is configured for putting the data request received by the request processing module 162 in a queue if the parameter managing module 160 determines that the active transaction number is not less than the maximum active transaction number. In one embodiment, the queue temporarily stores data requests that cannot be processed immediately by the data transmitter 10. The data transmitter 10 cannot process more data requests if the active transaction number is not less than the maximum active transaction number. As a result, the queue retrieving module 166 places subsequent data requests received by the request processing module 162 in the queue.

The message processing module 164 is configured for receiving the completing message from the data transmitter 10 and driving the USB 14 to transmit the prepared data to the application 18 of the data receiver 12.

The parameter managing module 160 is further configured for updating the active transaction number if the request processing module 162 has forwarded the data request to the data transmitter 10 or if the message processing module 164 has driven the USB 14 to transmit the prepared data to the application 18 of the data receiver 12. In one embodiment, the parameter managing module 160 increases the active transaction number if the request processing module 162 has forwarded the data request to the data transmitter 10. For example, the parameter managing module 160 may subsequently increase the active transaction number by 1. The parameter managing module 160 decreases the active transaction number if the message processing module 164 has driven the USB 14 to transmit the prepared data to the application 18 of the data receiver 12. For example, the parameter managing module 160 may subsequently decrease 1 from the active transaction number.

The queue retrieving module 166 is further configured for determining if there are any data requests in the queue and retrieving a data request from the queue if there is at least one data request in the queue. The queue retrieving module 166 retrieves a data request from the queue because the data transmitter 10 can process a new data request after the message processing module 164 has driven the USB 14 to complete transmitting at least one active transaction to the application 18 of the data receiver 12. As such, the request processing module 162 drives the USB 14 to forward the data request retrieved from the queue by the queue retrieving module 166 to the data transmitter 10.

The parameter managing module 160 is further configured for determining if the active transaction number is equal to the initial value of the active transaction number if the queue retrieving module 166 determines that there are no data requests in the queue. If the active transaction number is equal to the initial value of the active transaction number, the data transmitter 10 has finished processing all the data requests from the application 18. If the active transaction number is not equal to the initial value of the active transaction number, the data transmitter 10 has not finished processing all the data requests from the application 18, and as a result, the message processing module 164 continues receiving the completing message from the data transmitter 10.

Figure 2A:
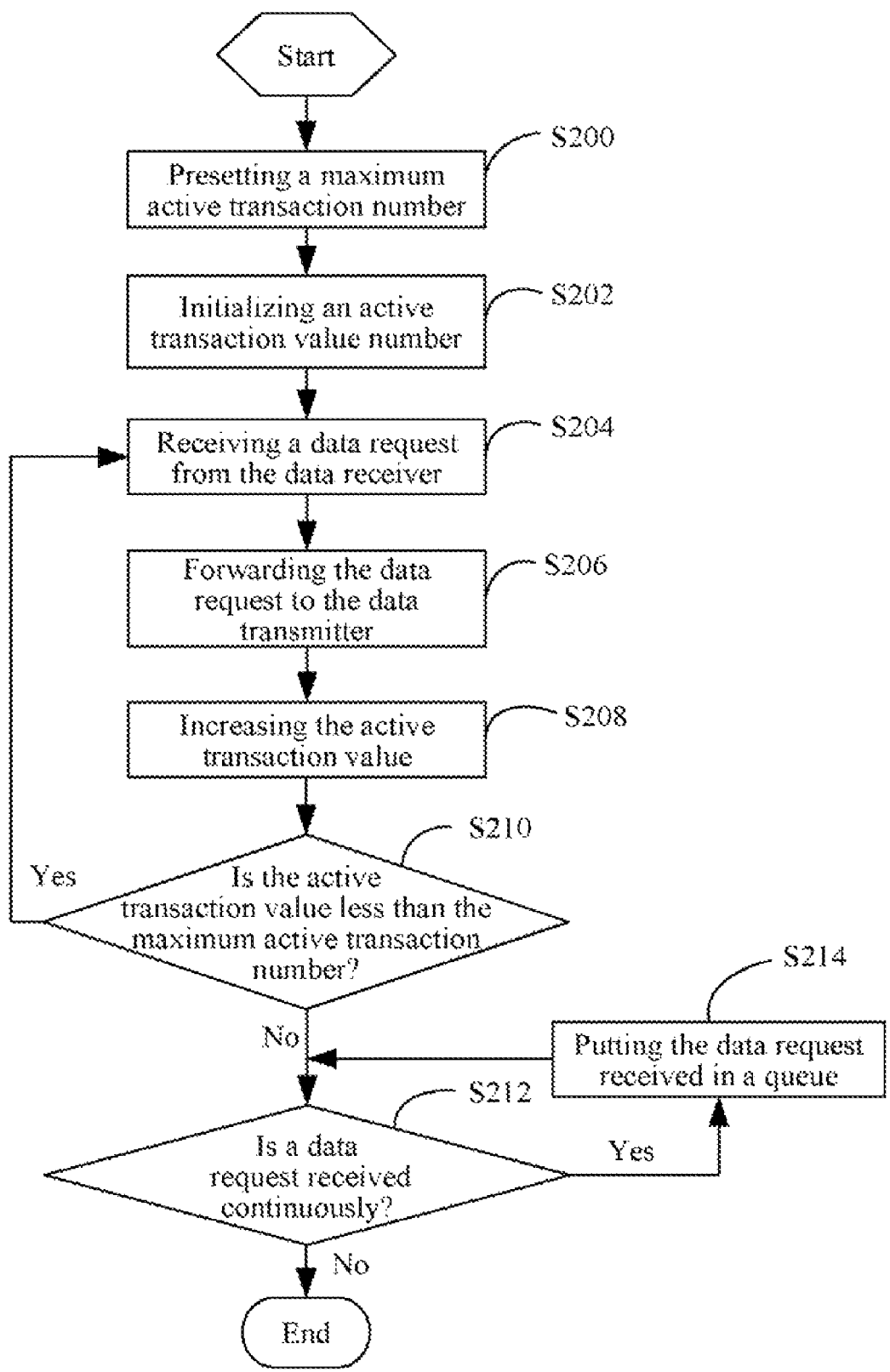
FIG. 2A and FIG. 2B are flowcharts of one embodiment of a USB driving method in accordance with the present disclosure.
Figure 2B:
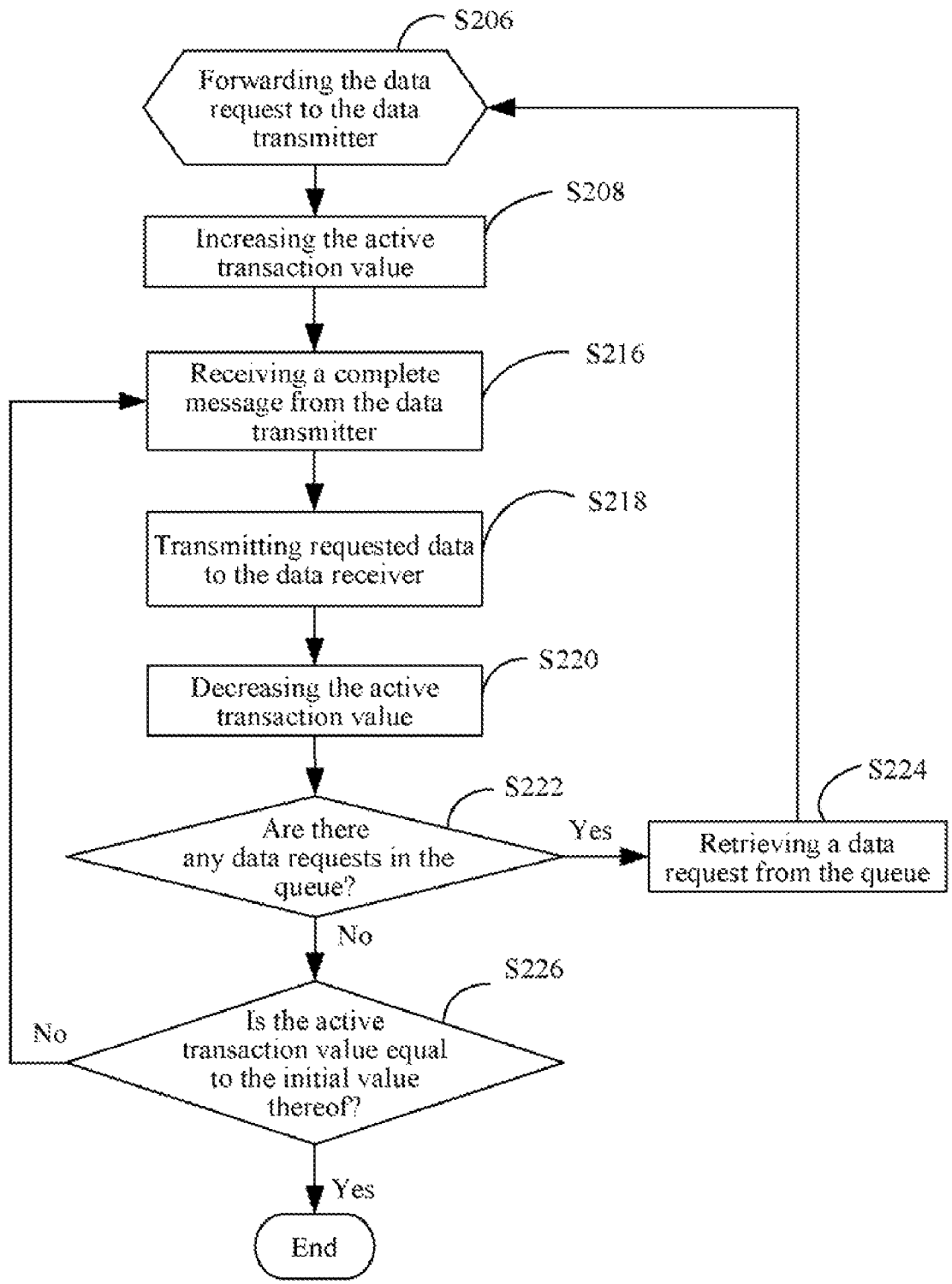

FIG. 2A and FIG. 2B are flowcharts of one embodiment of a USB driving method in accordance with the present disclosure. In the embodiment of FIG. 2A and FIG. 2B, the USB driving method is executed via the function modules depicted in FIG. 1. It may be understood that additional blocks may be added, others removed, and ordering of the blocks may be changed depending on the embodiment.

In block S200, the parameter managing module 160 presets a maximum active transaction number indicating an allowable maximum number of data requests synchronously processed by the data transmitter 10.

In block S202, the parameter managing module 160 initializes an active transaction number indicating a number of the data requests forwarded to the data transmitter 10. As mentioned above, the active transaction number is a variable that varies along with the number of data requests processed by the data transmitter 10. In one embodiment, the initial value of the active transaction number may be 0, for example.

In block S204, the request processing module 162 receives a data request from the application 18 of the data receiver 12.

In block S206, the request processing module 162 drives the USB 14 to forward the data request to the data transmitter 10. If the data transmitter 10 has received the data request, the data transmitter 10 prepares the requested data for the application 18 of the data receiver 12 according to the data request, subsequently sending a completing message to the USB diving device 16 via the USB 14. The USB diving device 16 transmits the prepared data to the application 18 via the USB 14 after the completing message is received.

In block S208, the parameter managing module 160 increases the active transaction number. In one embodiment, the parameter managing module 160 may increase the active transaction number by 1, for example.

In block S210, the parameter managing module 160 determines if the active transaction number is less than the maximum active transaction number.

If the active transaction number is less than the maximum active transaction number, which indicates the data transmitter 10 is capable of processing more data requests, then in block S204, the request processing module 162 continuously accepts data requests from the application 18 of the data receiver 12.

If the active transaction number is not less than the maximum active transaction number, which indicates the data transmitter 10 is not capable of processing further data requests, then in block S212, the request processing module 162 determines if the request processing module 162 receives a subsequent data request from the application 18 of the data receiver 12.

If the request processing module 162 receives a subsequent data request from the application 18 of the data receiver 12, then in block S214, the queue retrieving module 166 puts the subsequent data request in a queue and executes block S212, wherein the request processing module 162 re-determines if the request processing module 162 receives further data requests from the application 18 of the data receiver 12.

If the request processing module 162 receives further data requests from the application 18 of the data receiver 12, a data processing flow that indicates the procedure for processing data requests from the application 18 of the data receiver 12 from block S204 through block S214 is fully executed.

If block S208 of the data processing flow has been executed, the USB driving device 16 executes a completing message processing flow that is referenced in FIG. 2B. In one embodiment, the completing message processing flow indicates processing the completing message and the prepared data from the data transmitter 10. In one embodiment, the data processing flow is operated circularly and interrupted if the message processing module 164 receives a complete message from the data transmitter 10. Then the completing message processing flow is executed. Subsequently, the data processing flow is executed after the completing message processing flow has been fully completed. In another embodiment, the data processing flow is executed via a primary thread and the completing message processing flow is executed via a child thread if the message processing module 164 receives a complete message from the data transmitter 10.

In block S216, the message processing module 164 receives the completing message from the data transmitter 10. In one embodiment, the completing message indicates that the data transmitter 10 has finished preparing the requested data for the application 18.

In block S218, the message processing module 164 drives the USB 14 to transmit the prepared data to the application 18 of the data receiver 12.

In block S220, the parameter managing module 160 decreases the active transaction number. In one embodiment, the parameter managing module 160 decreases the active transaction number by 1, for example. If the active transaction number is decreased, the active transaction number is less than the maximum active transaction number. As a result, the data transmitter 10 is capable of processing a new data request.

In block S222, the queue retrieving module 166 determines if there are any data requests in the queue.

If the queue retrieving module 166 has determined that there is at least one data request in the queue, then in block S224, the queue retrieving module 166 retrieves a data request from the queue, subsequently returning to block S206 of FIG. 2A, wherein the request processing module 162 drives the USB 14 to forward the data request retrieved from the queue by the queue retrieving module 166 to the data transmitter 10.

If the queue retrieving module 166 has determined that there are no data requests in the queue, in block S224, the parameter managing module 160 determines if the active transaction number is equal to the initial value of the active transaction number. If the active transaction number is not equal to the initial value of the active transaction number, the data transmitter 10 has not completed processing all the data requests from the application 18.

If the parameter managing module 160 determines that the active transaction number is not equal to the initial value of the active transaction number, block S216 is executed, wherein the message processing module 164 continuously receives the completing message from the data transmitter 10.

In one embodiment, the USB driving device 16 is triggered to execute the data processing flow once if the application 18 of the data receiver 12 sends a data request. It also executes the completing message processing flow once the data transmitter 10 sends a completing message.

The USB driving device 16 of the present disclosure synchronously forwards more than one data request to the data transmitter 10 and putting excess data requests in the queue. Therefore, the USB driving device 16 of the present disclosure allows the data transmitter 10 synchronously process more than one data request. Subsequently, the USB driving device 16 of the present disclosure increases the efficiency of the data receiver 12 via the USB driving device 16, which meets the progressive need for data receiving efficiency.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A universal serial bus (USB) driving device, electrically coupled to a data receiver and configured for driving a USB to forward data requests from the data receiver to a data transmitter for processing the data requests, the USB driving device comprising:
a parameter managing module configured for presetting a maximum active transaction number, initializing an active transaction number, and determining if the active transaction number is less than the maximum active transaction number, wherein the maximum active transaction number is an allowable maximum number of data requests synchronously processed by the data transmitter, wherein the active transaction number indicates a number of the data requests forwarded to the data transmitter from the data receiver; and
a request processing module configured for driving the USB to forward a data request from the data receiver to the data transmitter if the active transaction number is less than the maximum active transaction number;
wherein the parameter managing module is further configured for increasing the active transaction number after the request processing module forwards a data request to the data transmitter.

2. The USB driving device as claimed in claim 1, wherein the data transmitter transmits a completing message and requested data to the data receiver after receiving the data request, wherein the completing message indicates that the data transmitter has finished preparing the requested data for the data receiver.

3. The USB driving device as claimed in claim 2, further comprising a message processing module configured for receiving the completing message from the data transmitter and driving the USB to transmit the requested data to the data receiver.

4. The USB driving device as claimed in claim 3, wherein the parameter managing module is further configured for decreasing the active transaction number if the message processing module has finished transmitting the requested data to the data receiver.

5. The USB driving device as claimed in claim 1, further comprising a queue retrieving module for putting the data request in a queue if the active transaction number is not less than the maximum active transaction number.

6. The USB driving device as claimed in claim 5, wherein the queue retrieving module is further configured for determining if there are any data requests in the queue after the message processing module has finished transmitting the requested data to the data receiver, and configured for retrieving another data request from the queue if there is still at least one data request in the queue.

7. The USB driving device as claimed in claim 6, wherein the request processing module is further configured for driving the USB to forward the data request retrieved from the queue by the queue retrieving module to the data transmitter.

8. A USB driving method, for driving a USB to forward data requests from a data receiver to a data transmitter for processing the data requests, comprising:
presetting a maximum active transaction number, wherein the maximum active transaction number is an allowable maximum number of data requests synchronously processed by the data transmitter;
initializing an active transaction number, wherein the active transaction number indicates a number of the data requests forwarded to the data transmitter from the data receiver;
receiving a data request from the data receiver;
driving the USB to forward the data request to the data transmitter;
increasing the active transaction number;

determining if the active transaction number is less than the maximum active transaction number; and continuously receiving subsequent data requests from the data receiver if the active transaction number is less than the maximum active transaction number.

9. The USB driving method as claimed in claim 8, further comprising:

receiving a completing message from the data transmitter indicating that the data transmitter has prepared requested data for the data receiver;

driving the USB to transmit the requested data to the data receiver; and decreasing the active transaction number.

10. The USB driving method as claimed in claim 9, further comprising:

determining if a subsequent data request is received from the data receiver if the active transaction number is not less than the maximum active transaction number; and putting the subsequent data request in a queue if the data request is received from the data receiver.

11. The USB driving method as claimed in claim 10, further:

determining if there are any data requests in the queue;

retrieving another data request from the queue if there is still at least one data request in the queue; and driving the USB to forward the data request retrieved from the queue to the data transmitter.

12. The USB driving method as claimed in claim 1, further comprising:

determining if the active transaction number is equal to an initial value of the active transaction number if there is no data request in the queue; and continuing to receive the completing message from the data transmitter if the active transaction number is not equal to the initial value of the active transaction number.

* * * * *